Oct. 5, 1926.
M. M. WHITE
1,602,060
MACHINE FOR MAKING FROZEN CONFECTIONS
Filed August 4, 1925
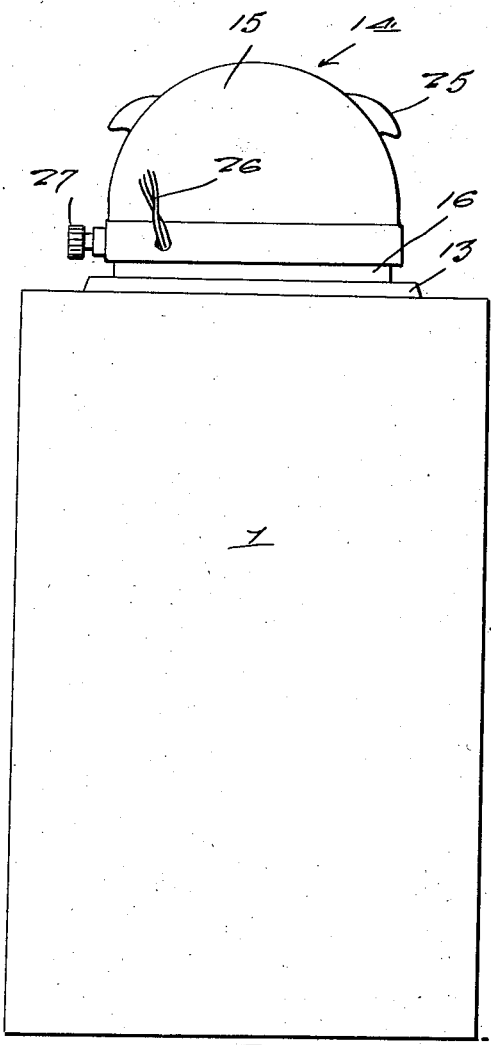
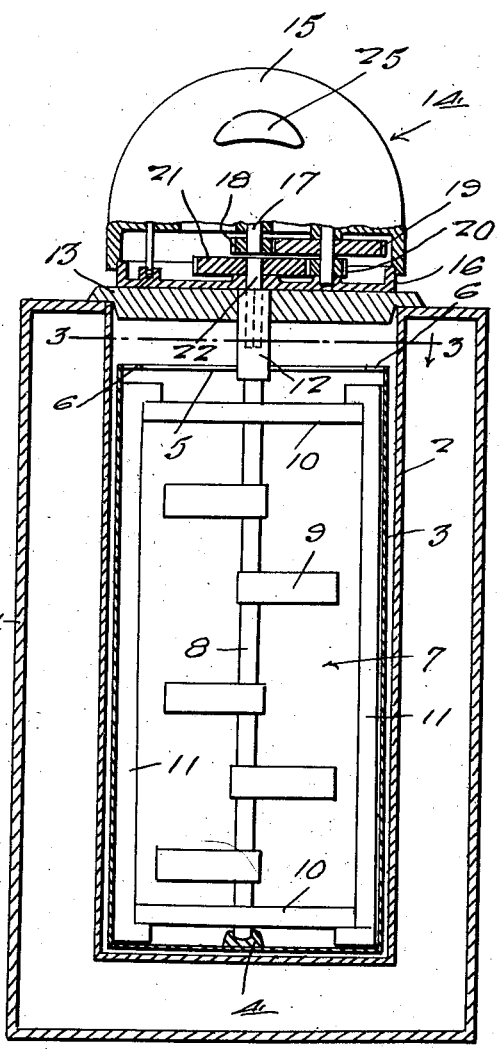
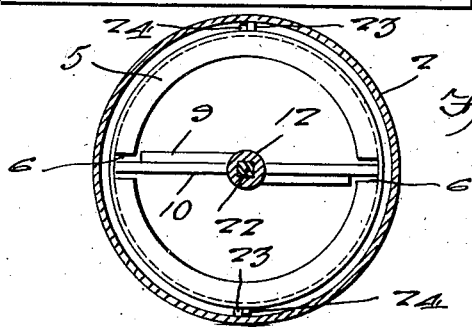
Inventor
M. M. White
By Clarence A. O'Brien
Attorney Patented Oct. 5, 1926.

1,602,060

UNITED STATES PATENT OFFICE.

MADISON MILLS WHITE, OF DENISON, TEXAS.

MACHINE FOR MAKING FROZEN CONFECTIONS.

Application filed August 4, 1925. Serial No. 48,099.

This invention relates to an improved machine or apparatus for making various kinds of frozen confections such as ice cream, sherbets, flavored ices of all kinds, and other similar frozen mixtures or products.

The invention has been devised with a view toward enabling the ordinary retail dealers of these products to manufacture the same at his own place of business in a simple and inexpensive manner, and at a great saving of time and money, as well as giving him the benefit of being able to have a variety of products when he wants them.

More specifically speaking, I propose the use of a structure which is adaptable for efficient association with conventional dispensing cabinets, soda fountain cabinets and domestic tubs, and the like. In this way a retail dealer is afforded a novel means which can be installed for operation in the particular kind of cabinet on hand, whereby to temporarily convert the same into a manufacturing plant for frozen products of the kind stated. Accordingly, various kinds of products may be produced in a short time, such as he knows will be readily salable to the particular class of customers to which he would ordinarily cater.

The invention has specific reference to an agitator adapted to fit into the can in which the untreated materials are placed, there being an electric motor provided for driving the agitator, and the two being readily separable to facilitate cleaning and removal and application.

Other features and advantages of the invention will become apparent from the following description and drawings.

In the accompanying drawing forming a part of this application and in which like numerals are employed to designate like parts throughout the same;

Figure 1 is a side elevation of a cabinet showing the improved structure in operative association therewith.

Figure 2 is a vertical sectional and elevational view showing the construction more plainly.

Figure 3 is a horizontal section taken approximately upon the plane of the line 3—3 of Figure 2 looking in the direction of the arrows.

Before proceeding with the detailed description, I would state that the invention comprises more particularly, the rotary agitator, the electric motor and its casing, together with a cabinet lid with which these two parts cooperate. In the drawing I show the invention in use with one type of cabinet, and it is to be understood that this showing is not to restrict the use of the invention, for it is intended to be used in connection with various kinds of conventional cabinets such as are placed in stores by local ice cream concerns, with cabinets such as are installed in association with soda fountains, or with common tubs, such as are ordinarily used for domestic purposes.

In the drawing, the reference character 1 designates a cabinet which may be of any desired construction. As shown in Figure 2, the cabinet is provided with an internal receptacle 2 which depends into the same, and is spaced from the walls to provide a space for containing a freezing medium, such as cracked ice, frigid air, or the equivalent.

The invention comprises a removable can 3, serving as a container for the frozen products. The can 3 is provided in the present instance with an internal boss 4 on its bottom serving as a bearing. At its top it is provided with a horizontal flange 5 provided with diametrically opposite notches 6 which serve a purpose to be hereinafter described. Fitted into the can for rotation is an agitator generally represented by the reference character 7. This comprises a vertical shaft 8 carrying stirrer blades 9, and provided at its top and bottom with arms 10 attached to scrapers 11. The blades 9 are preferably in alignment with the scrapers 11, and arms 10, so that the entire agitator may be lifted up and removed from the can through the diametrically opposite notches 6, Figure 3. The top of the shaft 8 is provided with a head 12 in turn provided with a polygonal socket. As shown in Figure 2, this head projects into and fits in a central opening formed in a removable cabinet lid or cover 13.

As before stated, electrical means is employed for operating the agitator. The means comprises a dome shaped casing 14 in which a motor (not shown) of suitable construction is housed. The casing embodies an upper half 15 and a lower part 16 bolted or otherwise connected together as indicated in Figure 2. Also, as shown in this figure, the motor shaft 17 projects into the space between these two parts and is equipped with a driving pinion 18 in mesh with a rotatably mounted gear 19. Mounted on the shaft of this gear 19 is another pinion 20 which is in mesh with a gear 21. This gearing train serves to operate a short shaft 22 having a polygonal lower end fitting into the head 12. A driving connection between the motor and the shaft 8 is thus provided. The entire dome 14 is detachable from the cabinet lid 13. In this way the motor may be lifted off the lid and out of engagement with shaft 8 after which the lid may be removed to permit the agitator to be taken out for cleaning. In fact, the agitator is ordinarily removed after the freezing of the contents of the can 3. Then the cover 13 is replaced, and the central opening is plugged by an appropriate closure.

Frequently, when the contents of the can become unusually hard, the can may rotate within the receptacle 2, thus interfering with the stirring operation. To avoid this, the receptacle 2 is provided with a pair of diametrically opposite stop lugs 23 with which lugs 24 on the can cooperate in abutting relation as shown in Figure 3. This will prevent relative rotation of the can and receptacle. It is yet to be pointed out that the dome 14 is preferably formed with handles 25 to facilitate handling. Moreover, as shown in Figure 1, the current supply wires 26 lead into the housing through a suitable opening and connect with the motor. The opposite ends of these wires will ordinarily be provided with a plug or suitable kind of a coupling whereby they can be attached to an ordinary lamp socket, or other domestic appliance to receive current. Then too, if desired, a suitable switch can be arranged within the motor housing to be controlled by the finger piece 27.

An apparatus of this kind will, no doubt, be found advantageous in the hands of various retail dispensers of frozen confections, whether in drug stores, confectionery stores, hotels, or other domestic places. Special fitting lids will be furnished for whatever kind of freezing receptacle the machine is to be used in connection with. Moreover, adjustments as to height may be compensated for by the telescopic driving coupling between the gear driven shaft and the agitator shaft.

It is thought that a careful consideration of the description in connection with the drawings will enable persons skilled in the art to which the invention relates to obtain a clear understanding of the same. Therefore, a more lengthy description is thought unnecessary.

Although the preferred embodiment of the invention has been specifically described and shown, it is to be understood that changes in the shape, size, and arrangement of parts coming within the field of invention claimed, may be restored to to comply with the demand made.

Having thus described the invention, what I claim as new and desire to secure by Letters Patent is:—

In a freezing apparatus and in combination, a receptacle having an interior abutment, a can disposed in said receptacle and having a projection at its side to bring up against said abutment, and also having an inwardly directed flange at its upper end and diametrically opposite notches in said flange, and an agitator rotatable in and removable from the can and including a shaft, blades on the shaft, and scrapers connected with the shaft, the said scrapers and the connections complementary thereto being alined and being adapted to be arranged in vertical coincidence with the notches in said flange whereby the agitator may be withdrawn and replaced rectilinearly through said notches.

In testimony whereof I affix my signature.

MADISON MILLS WHITE.